July 7, 1942.  W. T. JONES  2,289,020

AUTOMATIC VALVE

Filed Jan. 4, 1941

Inventor
William T. Jones
by Roberts Cushman Woodberry
att'ys.

Patented July 7, 1942

2,289,020

UNITED STATES PATENT OFFICE 2,289,020

AUTOMATIC VALVE

William T. Jones, Newton, Mass., assignor to Barnes & Jones, Incorporated, Jamaica Plain, Mass., a corporation of Massachusetts Application January 4, 1941, Serial No. 373,135

14 Claims. (Cl. 236—53)

This invention relates to valves of the kind in which a valve head is automatically moved toward and from its seat by a fluid motor housed within the valve casing. Thermostatically operated steam traps are valves of this class. The invention relates more particularly to a novel and useful construction and arrangement of the fluid motor or "diaphragm" and associated parts. While the invention is of broader utility, its embodiment in a thermostatic steam trap has herein been chosen for illustration of the principle of the invention, and the invention will be described specifically in relation to steam traps.

Thermostatic steam traps have been commercially used for many years. In such traps the valve head is actuated by a motor device, sometimes of the kind commonly referred to as a "diaphragm" consisting of two or more parts in flexible shells having an expansible fluid hermetically sealed between them and sometimes of the expansible bellows type. Commonly the diaphragms or bellows so used comprise several parts and have the joints between such parts sealed with solder. As the diaphragm or bellows is located within the steam space of the trap, the solder or other sealing means is directly exposed to the hot steam which exerts a deleterious action thereon. This results in a comparatively short life for the diaphragm or other motor device which requires expensive repairs and which, due to the failure of such motor means to act, may result in inefficient operation of other units connected into the same general system of piping.

For low pressure steam heating service it is possible, to a certain extent at least, to protect the joints of a diaphragm against the bad effects of the steam. Such a construction is illustrated, for example, in the patent to Jones No. 1,808,556, dated June 2, 1931. However, no satisfactory method has heretofore been devised for sealing the joints of a diaphragm where higher steam pressures are used, as is required for laundry, kitchen and process work where pressures as high as two hundred pounds or more are sometimes used. The usual solder made of tin and lead is not satisfactory for sealing joints subjected to pressures higher than fifty to sixty pounds per square inch, since the eutectic point, that is to say, the temperature to which the solder becomes soft and plastic, is below the temperature of the steam at such pressures so that the joints disintegrate and the diaphragm becomes ineffective. On the other hand, it is not practicable to use silver solder, brazing or welding in sealing the joints, for the high temperatures employed in so sealing the joints draw the temper from the thin resilient metal used in making the diaphragm. While the joint so made might be tight against leakage when new, the high degree of heat destroys certain qualities of the metal necessary to provide uniform operation and long life. This action of the heat upon the metal may be expressed as "burning" the metal.

Another difficulty experienced in the use of prior types of thermostatic trap for laundry, kitchen, or other uses, where high pressure steam is employed, results from the tendency of persons unskilled in handling high pressure steam to open valves to their full capacity from the closed position without any care to open the valve slowly. This may result in serious water hammer sufficient in some cases completely to wreck the thin metal diaphragm. Moreover, in most prior traps the diaphragm or bellows is suspended within the steam space out of contact with the casing wall so that the temperature of the fluid within the diaphragm or bellows does not vary as rapidly as it would if it were in direct contact with a good heat conductor such, for example, as the metallic casing of the trap.

A principal object of the present invention is to provide a trap in which the fluid motor device is so devised and arranged that none of its joints is located within the steam chamber of the trap or where the heat of the steam directly affects it. Another object of the invention is to provide a trap of such construction that the diaphragm will not be injured if water hammer occurs within the trap casing. Another object of the invention is to provide a trap so constructed and arranged as to provide for rapid heat transfer from the interior of the diaphragm, thus making the trap very responsive to temperature changes. Other and further objects and advantages of the invention will be pointed out hereinafter in the following more detailed description and by reference to the accompanying drawing wherein:

Figure 1:
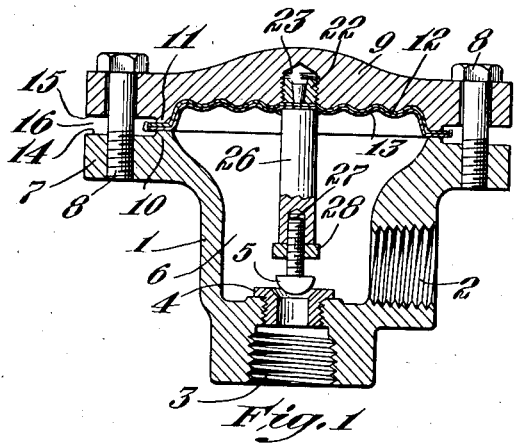
Fig. 1 is a vertical diametrical section of a trap embodying the present invention.

Referring to the drawing, the numeral 1 designates the body portion of the trap casing, such body portion having the inlet passage 2 and the delivery passage 3. A valve head 5 is arranged to cooperate with an annular seat 4 to control the fluid flow through the valve. This valve head 5 is arranged within the valve chamber 6 in the body of the casing into which the passage 2 leads. The body of the casing is provided at its upper part with a radial flange 7 having screw-threaded openings for the reception of bolts 8 by means of which a rigid cover member 9 is removably secured to the valve body. The flange 7 is provided with an upstanding annular rib 10 (Fig. 3) projecting above its upper surface and of a diameter such that it lies radially inward of the bolts 8. The cover 9 is provided with a downwardly directed annular rib 11 of substantially the same diameter as the rib 10 and designed to register with the rib 10 when the parts are assembled, the opposed horizontal surfaces of the ribs 10 and 11 being machined to a smooth finish and constituting clamping means as hereinafter described.

The motor means or diaphragm as herein illustrated comprises an upper disk-like member 12 and a lower disk-like member 13. These members 12 and 13 are preferably of substantially the same diameter and are made of a thin and resilient metal, for example, stainless steel or bronze. The lower disk 13, which constitutes the moving member of the motor device is imperforate, having no openings or joints within its boundaries, so that leakage through the member 13 is impossible.

Outwardly beyond the ribs 10 and 11 the casing body 1 and the cover 9 are so shaped as to provide opposed surfaces 14 and 15 which are spaced from each other so as to provide between them an annular chamber 16 through which the bolts 8 pass, this annular chamber being open at its outer edge to the atmosphere.

Figure 4:
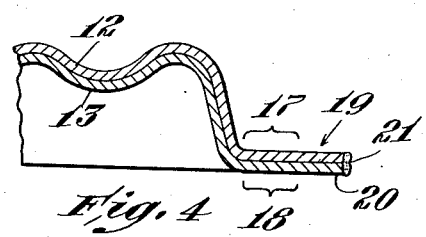
Fig. 4 is a fragmentary diametrical section of the marginal portion of the motor device or diaphragm removed from the casing.

The disks 12 and 13 are of such diameter that when assembled within the casing their outer edges are located within this annular chamber 16 and thus freely exposed to the outer air. Adjacent to their outer edges, but inwardly therefrom, the disks 12 and 13 are provided with substantially flat marginal portions 17 and 18 (Fig. 4) which, when the parts are assembled, are interposed and clamped fluid tight between the finished surfaces of the ribs 10 and 11.

In preparing this motor device or diaphragm for use in the valve structure, the parts 12 and 13 are united to form a unitary structure capable of receiving and holding a body of expansible fluid and of being handled and shipped as a unit ready for installation in the valve casing. To this end the peripheral edges 19 and 20 of the disks 12 and 13 (Fig. 3) are permanently united, as indicated at 21 preferably by brazing, electrical welding or the like, so as to form a leak-tight joint. During this operation the joint may be heated even to the point of drawing the temper of the metal of the disks 12 and 13 in the region of the joint, since this portion of the diaphragm takes no part in the operative movement of the device. During operation of the trap, this joint is located within the chamber 16 and always exposed to the air, so that the joint is not affected by the hot steam within the chamber 6 nor by direct contact with the heated casing, and thus, even if sealed with soft solder, would be dependable and durable. Moreover, since this portion of the diaphragm is wholly inactive during operation of the trap, it makes no difference, so far as the action or durability of the diaphragm is concerned that the operation of uniting the parts at the point 21 may have burned or otherwise injured the disks 12 and 13. Furthermore, since the area 17, 18 which is clamped between the ribs 11 and 12 is radially inward of the joint at 21, the surfaces at 17 and 18 of the disks remain smooth so that these marginal portions may be clamped between the ribs 11 and 12 and thereby form a steam-tight joint without the interposition of gaskets, all of the irregularity and roughness resultant from the formation of the joint being outwardly beyond the area at which the clamping takes place. This is a matter of great importance, since the diaphragms are calibrated for accuracy of operation by the manufacturer, and such accuracy would be seriously affected were a resilient gasket to be interposed between the diaphragm and the parts against which it rests in use.

Figure 2:
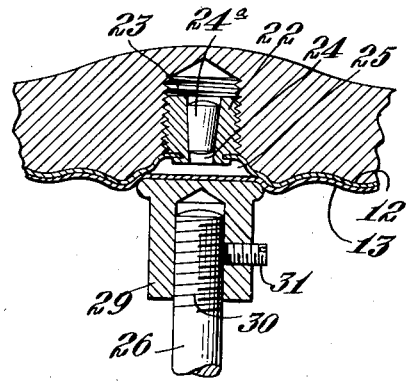
Fig. 2 is a fragmentary section, to larger scale, on the same plane as Fig. 1, showing details of construction at the central part of the cover and illustrating a slight modification.
Figure 3:
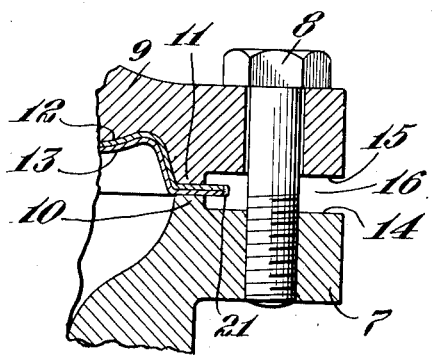
Fig. 3 is a fragmentary section, also on the same plane as Fig. 1 but to larger scale, showing details of the peripheral portion of the trap.

Preferably, as indicated in Figs. 1, 2 and 3, the diaphragm or motor device is so shaped that the upper disk 12 lies snugly against the inner surface of the rigid cover 9. If it be desired, as it is in some cases, that the disk 12 be formed with annular concentric ribs, then it is desirable that the inner surface of the cover 9 be likewise contoured so that the disk 12 will fit snugly against such inner surface throughout the major portion at least, of its area, the cover thus providing a rigid abutment for the disk 12. Preferably the lower disk 13 is imperforate and of substantially the same contour as the upper disk 12. In making up the motor device the space between the disks is preferably evacuated, and thus the lower disk 13 will press snugly against the upper disk throughout the major portion of its area. The upper disk never leaves contact with the cover and the major portion of the lower disk 13 is never far separated from the upper disk. Thus the motor device is not subject to injury as the result of excessive pressure in the chamber 6, due for instance to water hammer, since the most that can happen is that the lower disk 13 will be pressed firmly against the upper disk (at the same time compressing the fluid between the disks) and as the upper disk 12 contacts the rigid plate 9 it provides a rigid backing or abutment for the disk 13, and no undue stretching or rupture of the disks can take place.

In accordance with a preferred construction, as illustrated in Fig. 2, the central part of the upper disk 12 is domed so as to provide the small chamber 25 for the reception of a body of volatile or readily vaporizable fluid, for instance alcohol or a mixture of water and alcohol. For convenience in supporting the motor device within the casing and also to provide convenient means for filling the chamber 25 with fluid, it is preferred to attach a screw-threaded stud 22 to the central part of the disk 12 for example by silver welding, brazing or the like, such stud 22 preferably having external screw threads for engagement with the screw-threaded wall of an axial bore 23 in the cover 9. Even if the temper of the central part of disk 12 be drawn in so attaching the stud, no harm results, since disk 12 does not move substantially during operation of the trap. The stud 22 has an axial and preferably tapered bore 24 through which fluid may be introduced into the chamber 25. After the fluid has been introduced into the chamber 25, the bore 24 is closed by means of a tapered plug 24ª. In use, after a small quantity of the fluid selected has been introduced into the chamber 25 and the plug 24ª has been inserted, the motor device comprising the disks 12 and 13 may be mounted in the casing of the trap by removing the cover 9 and screwing the stud 22 into the threaded bore 23 in the cover. In thus screwing the stud 22 into the cover the marginal portion 17 of the disk 12 is brought into contact with the under surface of rib 11 of the cover. The cover is now assembled with the casing body and bolts 8 are screwed down thereby clamping the marginal portions 17 and 18 of the motor device firmly and leak-tight between the cover and casing, with the joint 21 at the edges of the disks disposed in the space 16, where it is not subjected to the chemical action of the steam and is kept at a safe temperature by direct exposure to the air.

For transmitting motion from the lower disk 13 to the valve head 5, a stem member 26 may, if desired, be welded directly to the under side of the disk 13, such stem, as here illustrated having a threaded bore at its lower end for the reception of a threaded stud 27 projecting up from the valve head 5, whereby the valve head may be initially adjusted relatively to the seat. A lock nut 28 may be used for securing the parts 26 and 27 in adjusted position.

Alternatively (Fig. 2) the stem 26 may be screw threaded at its upper end at 30 for engagement with a screw-threaded bore in a socket member 29 welded to the under side of the disk 13, a set screw 31 being provided for locking the stem 26 in adjusted position in the socket 29.

Figure 5:
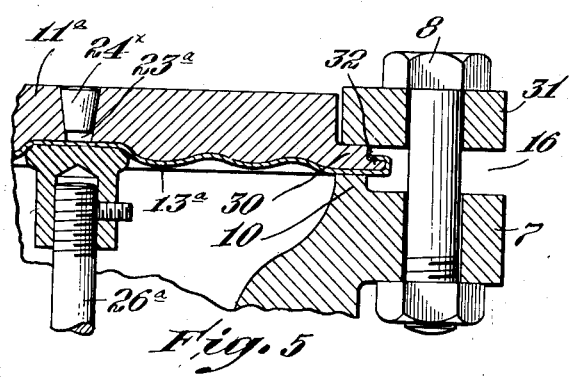
Fig. 5 is a fragmentary view, generally similar to Fig. 1, but showing a modification.

While it is preferred to employ a motor device comprising upper and lower disks 12 and 13 permanently united at their edges, as above described, it is possible to construct a useful motor device in which the casing cover itself forms the upper element and in which but a single flexible disk member is employed. Thus, as shown in Fig. 5, the cover member 11ª has a peripheral flange 30 providing a substantially horizontal upper surface for engagement by an annulus 31 separate from the cover and which has openings for the passage of the bolts 8, which, as in the device of Fig. 1, extend down through openings in the flange 7 of the casing body. In this instance, as in that previously described, the flange 7 has an upwardly directed annular rib 10 having a finished upper surface, but in the construction of Fig. 5 the under side of the annulus 31 is finished and constitutes the upper clamping element for cooperation with the rib 10.

The flange 30 of the cover member is provided with a thin radial lip 32 projecting outwardly beyond the rib 10 and into the space 16 when the parts are assembled. The disk member 13ª, corresponding to the lower disk 13 of the device of Fig. 1, normally engages the under surface of the cover 11ª throughout the major portion of its area, its marginal part being designed to overlie the upper surface of the rib 10 of the casing body. The edge portion of the disk 13ª is preferably turned up about the lip 32 and sealed by welding, brazing or otherwise permanently to said lip, the sealed joint being located within the space 16 and thus exposed to the outer air. The cover 11ª is provided with the central bore 23ª, the lower part of which constitutes a small fluid-receiving chamber, said chamber being sealed by a tapered plug 24ˣ. Motion is transmitted from the flexible disk 13ª to the valve head (not shown) by means of a stem 26ª secured to the center of the disk 13ª in any suitable way, for example, as above described. When in use, the flange 30 of the cover 11ª, together with the marginal portion of the disk 13ª, is clamped between the annulus 31 and the rib 10, and when steam is admitted to the interior of the casing the fluid in the chamber 23ª expands and pushes the disk 13ª downwardly so as to close the valve head against its seat.

Figure 6:
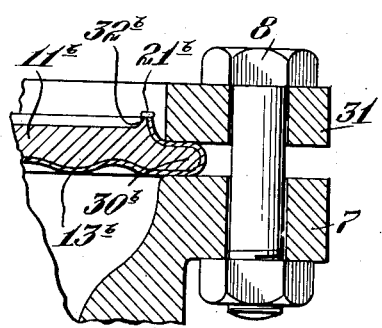
Fig. 6 is a fragmentary diametrical view illustrating a further modification.

In Fig. 6 a further slight modification is illustrated, corresponding very closely to that just described, except that in this instance the marginal portion of the cover 11ᵇ is provided with a rounded edge 30ᵇ and with a thin upstanding annular fin 32ᵇ. The flexible diaphragm disk 13ᵇ engages the lower surface of this cover member throughout the major portion of its area, and its margin is bent up around the edge 30ᵇ of the cover and is laid against the fin 32ᵇ to which it is brazed or welded to form a leak-tight joint at 21ᵇ. In this instance the part 30ᵇ of the cover with the margin of the disk 13ᵇ wrapped around it, is interposed directly between the upper surface of the flange 7 of the casing body and the lower surface of the clamping annulus 31, and itself serves to space the parts 7 and 31. It will be noted that the fin 32ᵇ is spaced from the inner surface of the clamping annulus 31 and is out of contact with any other part of the casing so that the soldered joint at 21ᵇ is outside of the steam space and is freely exposed to the air at the top surface of the valve.

As above described, in making the motor device, it is preferred to evacuate the space between the upper and lower disks 12 and 13 (or between the single disk and the inner surface of the cover) before introducing the volatile fluid, so that normally the disk or disks lie substantially against the inner surface of the cover, thus protecting the device from mechanical injury due to water hammer or the like, pressures as great as 1000 lbs. per square inch in the valve chamber 6 having no injurious effect upon the diaphragm. Moreover, with this arrangement, the motor device comprising one or more thin resilient disks with a fluid-receiving chamber between them, is disposed so close to the metal wall of the casing that heat is rapidly conducted from the motor device out through this wall to the atmosphere. Thus the motor device is more sensitive to variations in temperature than is one in which the device is suspended freely within the casing, and out of contact with the casing walls.

When the supply valve on the unit or fixture to which the trap is attached is opened, any air or condensate that may be in such unit enters the trap chamber 6 through the inlet 2 and thence flows freely out through the valve seat 4 and through the outlet 3. The valve head 5 remains in the normal open position until hot fluid, for example steam, enters the chamber 6. Thereupon the volatile fluid in the chamber 25 expands and forces the lower disk downwardly although the upper disk 12 remains in contact with the cover. As the disk 13 moves downwardly it closes the valve head 5 against the seat 4 and thus stops further flow of heated fluid through the trap into the discharge passage. When the steam in the heating unit or other device condenses, the cooler condensate flows into the trap chamber 6 thus reducing the temperature in said chamber and permitting the fluid in the chamber 25 to contract whereby the disk 13 again rises and raises the valve head 5.

While certain desirable forms of the invention have been illustrated by way of example, it is to be understood that the invention is not necessarily limited to these precise constructions but is to be regarded as broadly inclusive of any and all equivalents thereof.

I claim:

1. A thermostatically actuated steam trap of the kind having a fluid-tight casing provided with an inlet and with an outlet, said casing defining a chamber which houses a valve seat and a valve head cooperable with the seat, the trap including pressure motor means for moving the valve head, said pressure motor means comprising a flexible metallic disk having its major part within said chamber, the motor means including a second part to which said disk is permanently joined so as to provide a leak-tight union between them, the joint-forming means being located at the outer edge of the disk, said disk and second part defining between them a chamber, inwardly of the margin of the disk, which contains volatile fluid, the exterior of the disk being so arranged as to be exposed to fluid within the casing, and annular clamping means engaging the disk inwardly of its outer edge and which is operative to clamp the margin of the disk firmly against said second part, the outer edge of the disk, where the joint-forming means is located, being outside of the casing and freely exposed to the outer atmosphere whereby the joint is protected from the corrosive action of the pressure fluid and kept at a low temperature.

2. A steam trap of the kind having a fluid-tight casing provided with an inlet and an outlet and defining a chamber which houses a valve seat and a movable valve head cooperable with the seat, the casing including a removable rigid cover, the trap including pressure motor means for moving the valve head, said motor means comprising a flexible metallic disk coaxial with the cover and of a diameter such that its outer edge is located outside of the casing and exposed to the atmosphere, said disk defining one wall of a fluid-receiving chamber, the casing including annular clamping means coaxial with the disk and engaging the margin of the latter inwardly of its outer edge.

3. A steam trap comprising a fluid-tight casing providing a chamber which houses a valve seat and a movable valve head cooperable with the seat, the casing having inlet and outlet passages for fluid, and a fluid motor within said chamber, said motor including a plurality of flexible metallic disks having their edges permanently united to form a leak-tight joint, the casing comprising separable parts having opposed, finished contact surfaces between which the marginal portions of the disks are normally clamped leak-tight, the casing being so constructed and arranged as to provide a peripheral annular chamber freely open to the atmosphere and the disks being of such diameter and so arranged that their permanently united edges are located within said annular chamber.

4. A steam trap comprising a leak-tight casing which houses a valve seat, and a valve head cooperable with the seat to control the escape of condensate from the casing, the casing also housing a pressure motor for moving the valve head, the pressure motor comprising a pair of coaxial flexible metallic disks having their outer edges permanently united by metal to form a leak-tight joint, the casing comprising separable parts and means for uniting them, said separable parts having complemental clamping elements between which the marginal parts of the united disks, inwardly of their outer edges, are normally firmly clamped, the parts being so constructed and arranged that the outer united edges of the disks are disposed outside of the casing and out of contact with the casing parts and so that said edges are freely exposed to the outer atmosphere.

5. A steam trap comprising a fluid-tight casing which houses a valve seat, a valve head cooperable with the seat to control the escape of condensate from the casing, and a pressure motor for moving the valve head, the pressure motor comprising a pair of coaxial flexible metallic disks having their outer edges permanently united by metal to form a leak-tight joint, the casing comprising separable parts and means for uniting them, said separable parts having complemental annular clamping elements between which the marginal parts of the united disks are normally firmly clamped, said annular clamping elements having finished contact surfaces for engagement with the disks and being of such diameter as to contact the disks inwardly of the outer edges of the latter where the thickness of the disks is unaffected by the metal which unites their edges, the parts being so constructed and arranged that the united outer edges of the disks are located outside of the casing and out of contact with the casing parts and so that they are freely exposed to the outer atmosphere.

6. A steam trap comprising a casing including a leak-tight hollow body portion defining a valve chamber having therein a valve seat and a valve head cooperable therewith, the casing including a rigid removable cover, means for securing the cover to the casing, the casing and cover having coaxial registering annular ribs directed toward each other, a fluid motor for moving the valve head, said motor comprising two flexible metallic disks coaxial with the cover, the marginal portions of said disks being normally clamped between the opposed ribs of the casing and cover, the casing and cover being so designed and arranged as to provide a peripheral annular chamber which is open to the atmosphere, and the disks being of such diameter and so located that their extreme outer edges are located within said chamber and freely exposed to the air, said extreme outer edges of the disks being permanently united to form a leak-tight joint.

7. A steam trap comprising a casing including a leak-tight body portion having inlet and outlet connections and housing a valve seat and a valve head cooperable therewith, the casing including a removable cover, and means for removably securing the cover to the body portion of the casing, a fluid motor within the casing comprising two flexible disks coaxial with the cover and having their edges permanently sealed together to form a leak-tight union between them, means connecting the lower of said disks to the valve head, the central portions of the disks being spaced to provide a chamber for volatile fluid between them, the marginal portions of the disks being clamped directly between the body and cover of the casing, and the disks being of such diameter and so located that their outer permanently united edges are exposed to the air at the outside of the casing.

8. A steam trap comprising a leak-tight casing having inlet and outlet connections, a valve seat and a valve head housed within the casing, and fluid motor means for moving the valve head toward and from the seat, said fluid motor means comprising a fluid-tight chamber containing compressible volatile fluid, the chamber having opposed closely adjacent flexible walls, said walls normally contacting throughout the major portion of their opposed surfaces, and a rigid abutment surface with which one of said walls normally contacts, thereby to prevent excessive movement of said chamber walls in response to high pressure conditions within the casing.

9. A steam trap comprising a casing providing a fluid-tight chamber which houses a valve seat and a cooperating valve head, said casing having an inlet passage and an outlet passage, and fluid motor means for moving the valve head toward and from the seat, said fluid motor means comprising an expansible chamber containing compressible volatile fluid, one wall at least of said chamber being a flexibly resilient element, the casing having a removable imperforate rigid cover provided with an inner surface against which said flexible element normally fits snugly thereby preventing injury to said element from excessive pressure within the casing.

10. A steam trap comprising a casing providing a fluid-tight chamber which houses a valve seat and a cooperable valve head, the casing having inlet and outlet passages, and fluid motor means for moving the valve head toward and from the seat, said fluid motor means comprising a pair of thin flexible metallic members having their edges permanently united, the central part of one of said flexible members being normally spaced from the other to provide a fluid receiving chamber, the major portions of the flexible members being substantially in contact at normal temperatures, and the casing having a removable rigid imperforate cover having an inside surface with which one of said flexible members normally contacts throughout the major portion of its area whereby said flexible member is supported against injury due to excessive pressure within the casing.

11. A steam trap comprising a casing, a valve seat and a valve head within the casing, and fluid motor means for moving the valve head toward and from the seat, said fluid motor means including thin flexible metal members constituting the walls of an expansible chamber for volatile fluid, the casing including a removable rigid imperforate cover having an inner surface with which one of said flexible metal members is always in contact thereby providing substantially uninterrupted metallic heat transfer from the interior of said expansible chamber to the outer atmosphere.

12. A valve device comprising a casing, a valve seat and a valve head cooperable with the seat, and fluid motor means for moving the valve head toward and from the seat, said fluid motor means comprising a thin, flexible disk, means cooperating with the central part of the disk to provide a chamber of small superficial area containing a volatile fluid, the casing including a rigid wall, a thin disk which fits snugly against the inner surface of said wall and which provides a rigid abutment surface against which the major portion of the first disk normally fits snugly whereby the latter disk is protected against damage by water hammer within the casing, said first-named disk gradually separating from the second disk in response to expansion of the volatile fluid, thereby progressively increasing the effective area of the first disk against which said fluid may act.

13. A valve device comprising a casing, a valve seat and a valve head cooperating with the seat, and fluid motor means for moving the valve head toward and from the seat, said fluid motor means comprising a pair of thin, flexible, coaxial disks united leaktight at their peripheral edges, means providing a chamber of small capacity between the central parts of the disks, said chamber being filled with a volatile fluid, the disks gradually separating in response to expansion of said fluid, thereby to provide progressively increasing areas for contact with said fluid, and a rigid abutment against which one of said disks always fits snugly so as to provide an unyielding surface with which the major portion of the other disk normally contacts, whereby the disks are protected against damage by water hammer within the casing.

14. A steam trap comprising a leaktight casing having inlet and outlet connections, a valve seat and a valve head housed within the casing, and fluid motor means for moving the valve head toward and from the seat, said motor means comprising a flexible disk, the casing having a rigid wall provided with an inner surface with which the major portion of said disk normally contacts, said surface constituting an abutment for said disk such as to prevent damage to the disk in response to water hammer within the casing, the motor means comprising parts defining an expansible chamber located substantially at the center of the disk and which is normally of substantially less superficial area than the disk, the chamber being filled with volatile fluid and the parts being so constructed and arranged that the superficial area of the chamber gradually approaches that of the disk as the fluid expands.

WILLIAM T. JONES.